(12) United States Patent
Kailash et al.

(10) Patent No.: US 10,262,136 B1
(45) Date of Patent: Apr. 16, 2019

(54) CLOUD-BASED MALWARE DETECTION

(75) Inventors: Kailash Kailash, San Jose, CA (US);
Robert L. Voit, Milpitas, CA (US);
Jose Raphel, Austin, TX (US)

(73) Assignee: Zscaler, Inc., San Jose, CA (US)

( * ) Notice: Subject to any disclaimer, the term of this patent is extended or adjusted under 35 U.S.C. 154(b) by 2406 days.

(21) Appl. No.: 12/185,484

(22) Filed: Aug. 4, 2008

(51) Int. Cl.
*G06F 11/00* (2006.01)
*G06F 21/00* (2013.01)
*G06F 21/56* (2013.01)

(52) U.S. Cl.
CPC .................................. *G06F 21/56* (2013.01)

(58) Field of Classification Search
CPC ........................... G06F 21/56; H04L 29/06918
USPC ............................................... 726/23, 24, 25
See application file for complete search history.

(56) References Cited

U.S. PATENT DOCUMENTS

| | | | | |
|---|---|---|---|---|
| 7,392,544 | B1* | 6/2008 | Pavlyushchik | 726/24 |
| 7,577,946 | B2* | 8/2009 | Murakami et al. | 717/145 |
| 7,634,262 | B1* | 12/2009 | Li | 455/419 |
| 2003/0027552 | A1* | 2/2003 | Kouznetsov | 455/410 |
| 2003/0033536 | A1* | 2/2003 | Pak et al. | 713/188 |
| 2003/0131256 | A1* | 7/2003 | Ackroyd | 713/201 |
| 2005/0044212 | A1* | 2/2005 | Lingafelt et al. | 709/224 |
| 2006/0095470 | A1* | 5/2006 | Cochran et al. | 707/104.1 |
| 2006/0294588 | A1* | 12/2006 | Lahann et al. | 726/23 |
| 2007/0294768 | A1* | 12/2007 | Moskovitch et al. | 726/24 |
| 2008/0134337 | A1* | 6/2008 | Crescenzo et al. | 726/24 |
| 2008/0141371 | A1* | 6/2008 | Bradicich | G06F 21/552 726/23 |
| 2008/0196104 | A1* | 8/2008 | Tuvell et al. | 726/24 |
| 2009/0019547 | A1* | 1/2009 | Palliyil | G06F 21/566 726/25 |
| 2009/0222920 | A1* | 9/2009 | Chow et al. | 726/23 |
| 2009/0328220 | A1* | 12/2009 | Abdel-Aziz et al. | 726/24 |
| 2011/0041182 | A1* | 2/2011 | Stenfelt | 726/23 |

OTHER PUBLICATIONS

White, Ron, How Computers Work, 9th Ed., Que Corporation, Nov. 14, 2007.*
Derfler, Frank J. et. al., How Networks Work, 7th Ed., Que Corporation, Oct. 18, 2004.*
Gralla, Preston, How Wireless Works, 2nd Ed., Que Corporation, Oct. 24, 2005.*
White, Ron, How Computers Work, 7th Ed., Que Corporation, Oct. 15, 2003.*

* cited by examiner

*Primary Examiner* — Abhishek Vyas
*Assistant Examiner* — Murali K Dega
(74) *Attorney, Agent, or Firm* — Clements Bernard Walker PLLC; Lawrence A. Baratta, Jr.

(57) ABSTRACT

Systems, methods and apparatus for malware detection detect and stop the distribution of malware and other undesirable content before such content reaches computing systems. A malware detection service external to network edges of a system receives a request from a computer within the system, the request identifying a signature associated with content. The service determines a status indicator of the content using the signature, and transmits the status indicator to the computer.

23 Claims, 4 Drawing Sheets

CLOUD-BASED MALWARE DETECTION

BACKGROUND

This disclosure relates to malware detection.

The prevalence and accessibility of computer networks requires security measures to protect valuable information. An enterprise, for example, can implement such security measures by using multiple systems at the network edge of the enterprise, e.g., firewalls, gateway security agents, or software security systems in each computing device.

Internally distributed deployment of security solutions have processing inefficiencies. Same file may be inspected by many distributed security systems and malware detection software.

Malware detection software must be updated periodically on user's computing devices and gateway security systems. As new malware is found, new signatures and/or logic must be added. Distribution of changes in such software programs is expensive and time consuming. Another issue is that for small/mobile computing devices such as phones, PDAs, and Laptops, malware detection programs consume considerable space and require considerable processing time.

Yet another problem is the number of devices on which malware detection programs must be updated. Typically, organizations have several thousand computing systems, several operating systems, and hardware platforms and malware products from different vendors.

One alternative applicable for enterprise users is to run malware detection programs on gateway systems such as integrated firewalls. In this case, the upgrades are applied only to the firewall systems. However, there is no direct way of knowing whether the gateway protection is working. For instance, a new malware will not be not detected if it reached the user's computer before a corresponding signature is upgraded in the gateway.

Another alternative is the use of a hosted malware detection service where files are sent to a remote service for inspection. Although this permits the use of a centralized upgrade to malware programs, the data traffic to the hosted service point can consume valuable uplink bandwidth and can result in a speed bottleneck for the inspection of files. For this reason, hosted services are not used by end-users. In addition, there is the possibility of accidental information leakage when information is transmitted outside of an enterprise network. Documents that contain sensitive information must not be sent for external inspection.

SUMMARY

The subject matter described in this specification is directed to malware detection. A simple scanning agent runs on a computing device to compute and send signatures of selected files to a malware detection service located on an external network to the computing device. The malware detection service identifies whether files are trusted, i.e., do not contain malware, or untrusted, i.e., likely to or containing malware, and reports this information back to the computing device. The computing device transitively builds list of trusted files. When all files are trusted the computing device can be deemed trusted. Additions of new programs and data files are examined by the malware detection service using minimal data transfer. Typically very few bytes, e.g., 16 bytes, of signature information along with a very few bytes, e.g., 4 bytes, of document length is sent instead of several megabytes of data per file. Only files that are changed since last inspection in its signature, length or last modified date need to be sent.

In general, one aspect of the subject matter described in this specification can be embodied in systems that include a malware detection service external to network edges of at least one external system, where the malware detection service is configured to receive a request from a computer within the at least one external system, the request identifying a signature associated with content. The malware detection service is further configured to identify a status indicator of the content using the signature, and transmit the status indicator to the computer. Other implementations of this aspect include corresponding systems, apparatus, and computer program products.

According to another aspect the subject matter described in this specification can be embodied in systems that include an access agent located within the network edges of a system, where the access agent is configured to generate a signature for content residing within the network edges of the system, the signature generated using a hashing algorithm. The access agent is also configured to transmit the signature to a malware detection service located external to the network edges of the system, and receive a status indicator for the content from the malware detection service. Other implementations of this aspect include corresponding systems, apparatus, and computer program products.

The subject matter described in this specification also includes other aspects. One or more of the following advantages can be realized by implementations of the subject matter described in this specification. The manageability of malware detection and prevention is enhanced, resulting in reduced processing time, upgrade costs, and information leakage.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
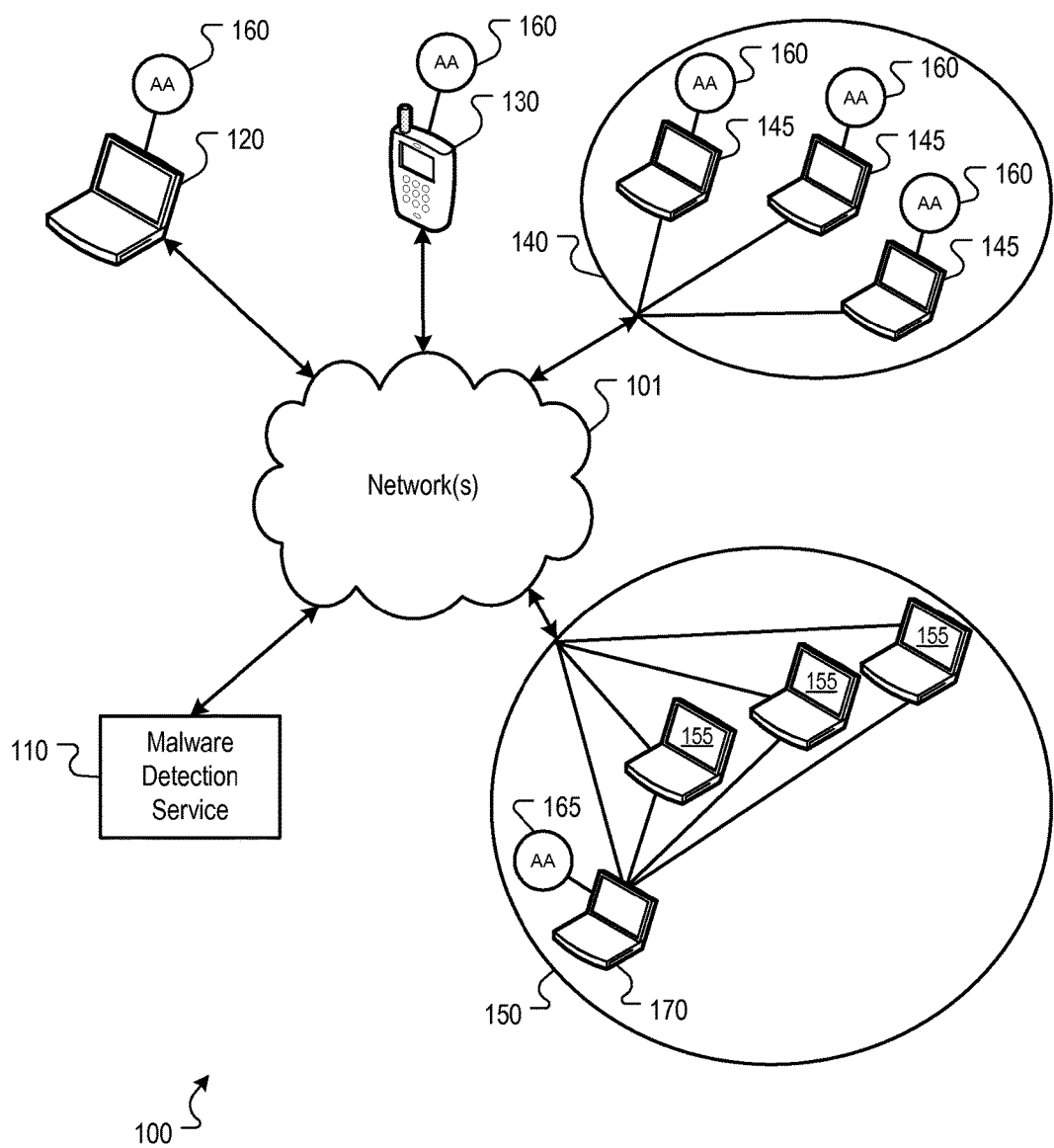
FIG. 1 is a block diagram of a distributed security system.

FIG. 1 is a block diagram of a distributed security system 100. One or more networks 101, such as the Internet, a wide area network, or some other combination of wired and/or wireless networks, one or more external systems 120, 130, 140, and 150 to a malware detection service 110. The malware detection service 110 detects and precludes the distribution of security and performance threats, e.g., malware, sent from or requested by an external system. Example external systems can include enterprises 140 and 150, a computer device 120, and a mobile device 130, or other network and computing systems. The term malware is used throughout the present disclosure to include any undesirable content that can pose a security risk or negatively impact the performance of a computing device, including, for instance, viruses and spyware.

The external systems 120, 130, 140, and 150 can, for example, include a firewall protecting an internal network that can include one or more enterprise servers The systems 120, 130, 140, and 150 may communicate with the WAN 101 through one or more network devices, such as a router, gateway, etc.

In some implementations, a client access agent (software) 160 is included in one or more client computers 120, 130, and 145 within or comprising the external systems 120, 130, and 140. In other implementations the clients 155 will not have their own access agent, rather another computer 170 will run the access agent 165 which will use the enterprise LAN file share system to access the client files and use the internet or other WAN to communicate with the MDS that performs malware detection. The client access agent facilitates security processing by providing hash values of files on a user computer to the malware detection service 110 for malware detection. Other security operations can also be facilitated by the access agent.

§ 1.0 Malware Detection

Figure 2:
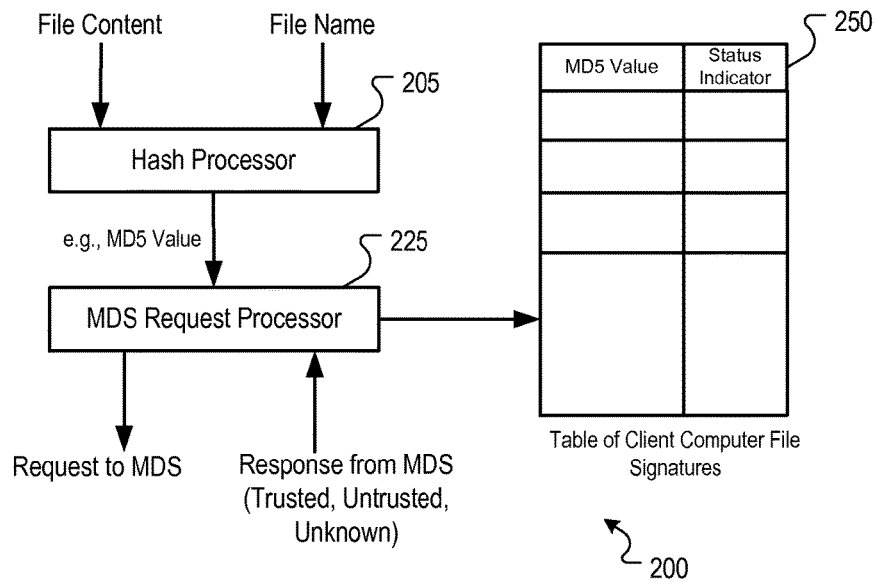
FIG. 2 is a functional block diagram of an example access agent.

The systems described with respect to FIG. 1 is operable to detect malware. To effect malware detection, a malware detection service (MDS) 110 is employed that is external to network edges of the external systems 120, 130, 140, and 150. The MDS 110 is accessed by a client access agent(s) on a client computer within an external system 120, 130, 140, and 150. The access agent includes a scanning agent to compute and send hashes of selected files to the MDS 110. The MDS 110 sends back its degree of trust of those files to the client computer. The client computer transitively builds list of trusted files § 2.0 Access Agent A functional block diagram 200 of an example client access agent on a client computer is shown in FIG. 2. File content and file names for one or more files on a client computer are provided to a hash processor (or digest processor). The hash processor facilitates security processing by providing a hash of files on the user computing devices 120, 130, 145, and 155. According to some implementations, a Message-Digest algorithm (MD5) can be used by the hash processor 205 of the access agent. The hash processor 205 can compute the signature of the files on the client computer, e.g., using MD5 digest of the file content and optionally, file name and/or file size (not illustrated).

The signature of files on the client computer can be transmitted to the MDS for analysis by an MDS Request Processor 225. The transmission of a hash (or digest) instead of a whole file results in a significant reduction of transmission time, particularly for systems having a large number of files. For instance, in a digest, typically 16 bytes of information is transmitted to the MDS for each file. In a system having 20,000 modified files, this would amount to a total 400,000 bytes of data, which can be transferred to the MDS in seconds.

Upon receiving a response from the MDS that a file is trusted, untrusted, or unknown, a local (or enterprise) table of file signatures 250 can be updated by the MDS Request Processor 225. In particular, the table can be updated to reflect that the received status indicator is associated with a particular signature. For instance, a status indicator may be that a file is trusted or untrusted. The file can be indexed by its signature, e.g., MD5 value. If a response of unknown is returned by the MDS, the access agent can transmit the entire file to the MDS for inspection to determine whether the file is trustworthy. According to some implementations, a file having a different name may be trusted if its file size and hash match those of a file previously deemed as trusted.

The table of file signatures 250 permits the access agent to build a list of trusted files on the client computer. According to some implementations, the table of file signatures and their respective status indicators may be used by the MDS request processor 225 to identify whether programs were previously examined by the MDS and deemed trusted or untrusted such that a further request to the MDS is not required for those files. Thus, when the access agent has populated the local table of file signature 250, further transmissions to the MDS occur only if a file signature is changed or if new files are added.

§ 3.0 MDS

Figure 3:
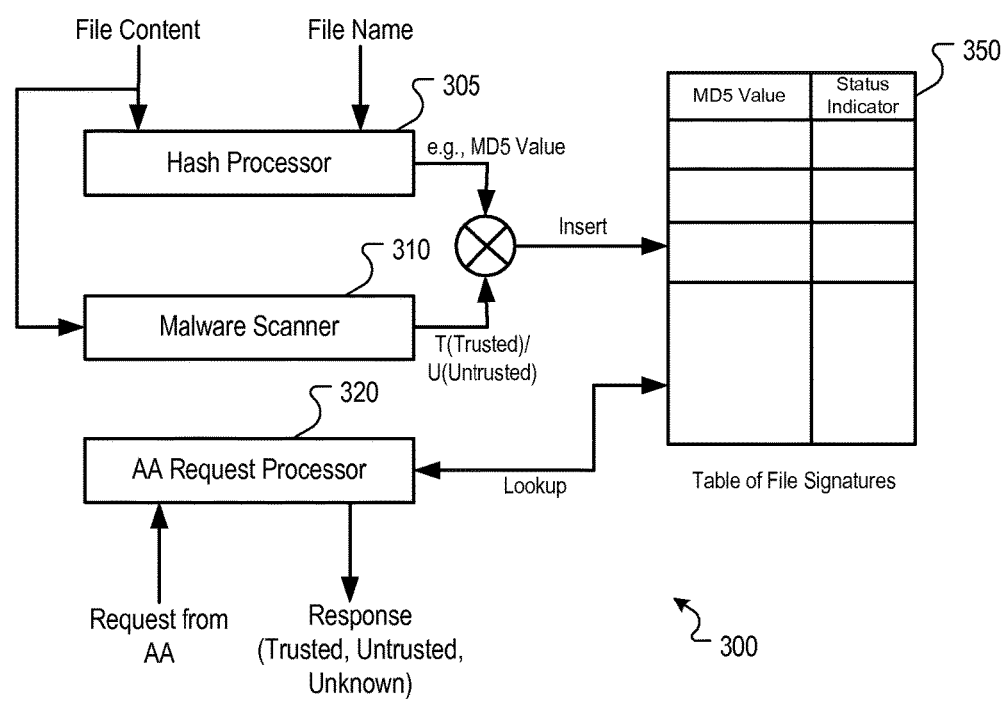
FIG. 3 is a functional block diagram of an example malware detection service.

A functional block diagram 300 of an example MDS 300 is shown in FIG. 3. The MDS 300 can represent the malware detection service 110 of FIG. 1.

The MDS 300 is operable to receive file content for inspection at a malware scanner 310. This can occur, for instance, when new file content is identified but has not yet been assigned as trusted or untrusted by the MDS 300. New file content can represent a new or updated file, such as a new file created by a client computer. The malware scanner 310 is operable to scan the file content to determine whether the content is trusted or untrusted.

The file content and file name is also received at a hash processor 305. The hash processor 305 executes the same hash as performed by hash processor 205 of the access agent 200, as described with respect to FIG. 2. According to some implementations, a Message-Digest algorithm (MD5) can be used by the hash processor 305, which can compute the signature of files received by the MDS 300 using the file content and optionally, file name and/or file size (not illustrated). The use of a malware scanner 310 at the MDS enables malware scanner updates to occur at a single location, rather than at every client computer.

The output of the hash processor 305 and malware-scanner 310 is inserted into a table of file signatures 350 together with a status indicator, for instance, trusted or untrusted. According to some implementations, the table of file signatures 350 can represent a global table for all files on client computers within a particular system. The table contains the signatures, e.g., MD5 values, for known good files (i.e., trusted files) and malware (i.e., untrusted files). According to some implementations, the MDS 300 can also maintain a second table (not illustrated) that includes a transient list of signatures of recently scanned good files that are sent to a specific client computing device. The second table can also contain signatures of files that the client computing device trusts using configured rules. Thus, both a global malware table or a enterprise specific table can be maintained.

As shown in FIG. 3, the MDS 300 receives a request from an access agent at an access agent (AA) request processor 320 that includes the hash (or digest) of a file for inspection by the MDS 300. The AA request processor 320 checks the received hash against the global table 350 of known good and known malware file signatures. If a matching entry is found, the status indicator corresponding to the signature is located, and an answer of either "trusted" or "untrusted" is sent to the client computer for the known good and known malware, respectively. The client access agent uses the response from the MDS to build a local table of trusted programs, as described above. A program is trusted if it was previously inspected by the malware scanner 310 and found to trusted. According to some implementations, a file generated by a trusted program is trusted, and a trusted file modified by a trusted program is trusted.

In some implementations, when the AA request processor 320 does not find a matching hash signature in the global table 350, the AA request processor 320 can consult a second table that includes a transient list of signatures of recently scanned good files that are sent to a specific client computing device. For instance, if no information on the file "word.exe" is stored within the global table 350, but the client computing device determines the file to be trusted (e.g., 'good'), then the client may assume that anything created by "word.exe" is good and corresponding signatures for those files may be stored locally at the client computing device. Thus, for instance, a file "abc.doc" created by the trusted "word.exe" and its signature is stored locally. In some implementations locally stored signatures may not be shared with other networks. If the AA request processor 320 does not find a matching signature in either table, the processor 320 will transmit a response to the client computer that the content is unknown. If that occurs the access agent of the client computer may send the entire file content to the MDS for inspection.

§ 4.0 Preventing Attacks

Malware created to have a signature that matches that of trusted content could limit the utility of the MDS. For instance, malware could be generated having a random sequence of bytes which do not affect the malware (e.g., comments in scripts, NOOPs and data bytes in executable programs, etc.) The random bits could be modified until the malware's signature matches one of the signatures of the known good programs.

In order to prevent the attack from succeeding, the access agent can prepend the file content with a random sequence of bytes. The random sequence of bytes may be generated, for instance, by the access agent, computer, or another component in the system. For instance, the random sequence can be randomly generated by MDS and communicated to access agent, which could also reduce the number of global tables required to be maintained. According to an example, if f1 and f2 are two files where in f1 is a known good file and f2 is malware. If f2 was constructed by a malware creator such that the signature of f1 is the same as the signature of f5 (e.g., MD5(f1)=MD5(f2)), then a random sequence of bytes 'r' should be added such that the MD5 signature of r.f1 is not equal to the signature of r.f2 (e.g., MD5(r.f1)≠MD5(r.f2) where r.f1 denotes contents of f1 prepended by sequence r and similarly r.f2 denotes contents of f2 prepended by r). The random sequence of bytes may be changed periodically.

§ 5.0 Example Processes of Access Agent for Providing Malware Detection

Figure 4:
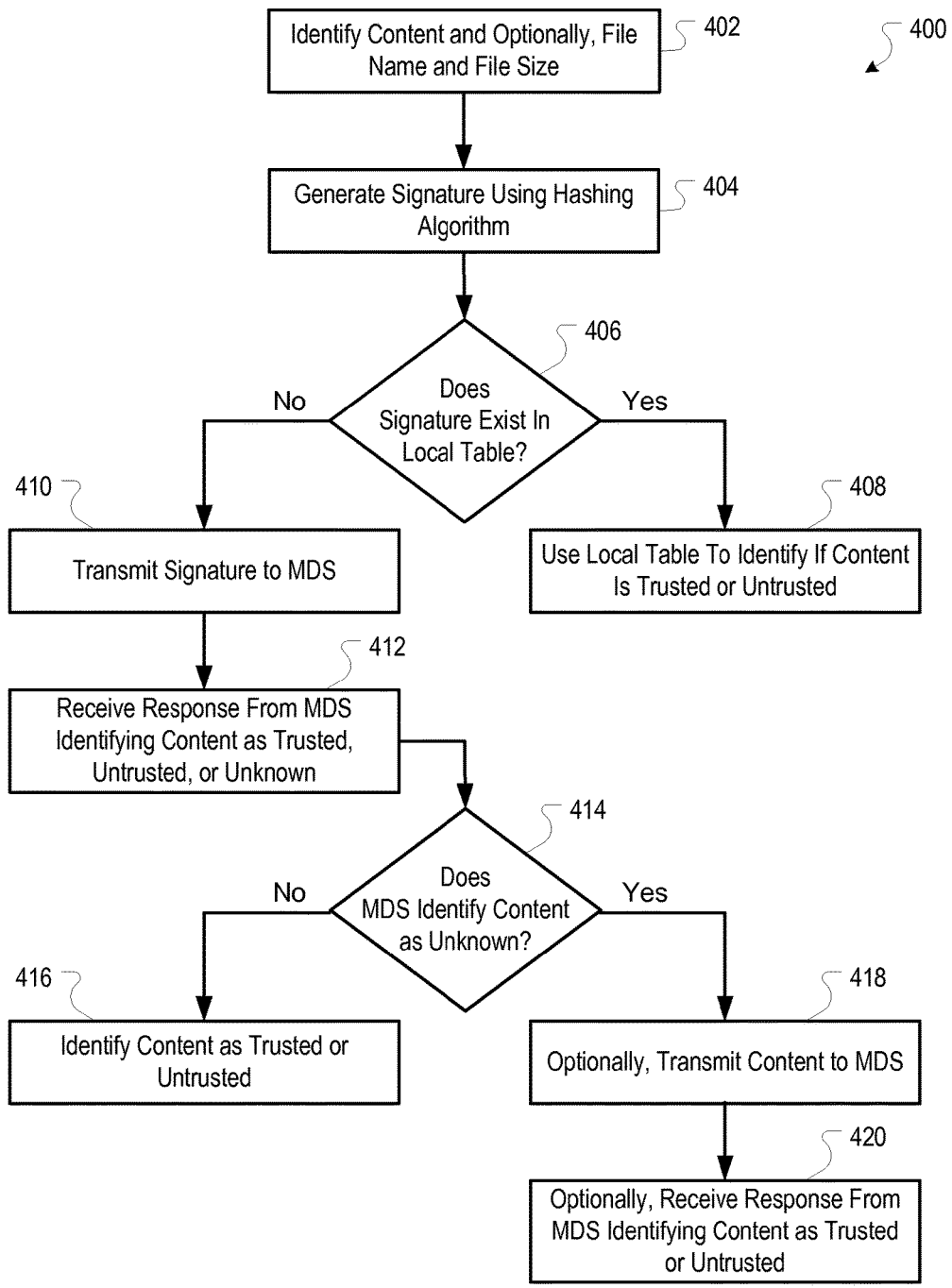
FIG. 4 is a flow diagram of an example process of an access agent for providing malware detection.

FIG. 4 is a flow diagram of an example process 400 of an access agent for providing malware detection. The process 400 can, for example, be implemented in an access agent 160 or 165 in the system 100 of FIG. 1. The stages shown in FIG. 4 are each processes that can be executed independently and concurrently as appropriate.

Stage 402 identifies content, and optionally, a file name and a file size. The content is identified for a determination whether the content is malware and thus should not be 'trusted'. According to some implementations, the access agent identifies content on a client computer on which the access agent resides. According to some implementations, the access agent identifies content on servers, computers, or other devices in an enterprise 120, 130, 145, and 155.

Stage 404 generates a signature using a hashing algorithm. In particular, a signature is generated by hashing the content, and optionally, the file name. According to some implementations, the signature can be generated by the hash processor 205 within the access agent. As an example, the signature can be generated by an MD5 algorithm.

Stage 406 determines whether a signature exists in a table local to the access agent. If the signature exists in the table, stage 408 uses the local table to identify if the content is trusted or untrusted. According to some implementations, this may be performed by the MDS request processor 225 of the access agent. If the signature fails to exist in the table, stage 410 transmits the signature to the MDS 300 for analysis, for instance, by an MDS Request Processor 225.

Stage 412 receives a response from the MDS 300 identifying the content as trusted, untrusted, or unknown. The response is received, for instance, at the access agent from an AA request processor 320.

If the content is identified as unknown at Stage 414, the content may optionally be transmitted to the MDS 300 at Stage 418, for instance, by the access agent. A hash processor 305 of the MDS 300 can receive the content at the MDS 300. In stage 420 a response is received from the MDS identifying the content as trusted or untrusted. The response is received from the MDS by the access agent. Alternatively, if the content is not unknown at Stage 414, the content is identified as trusted or untrusted, for instance, by the access agent.

6.0 Example Processes of MDS For Providing Malware Detection

Figure 5:
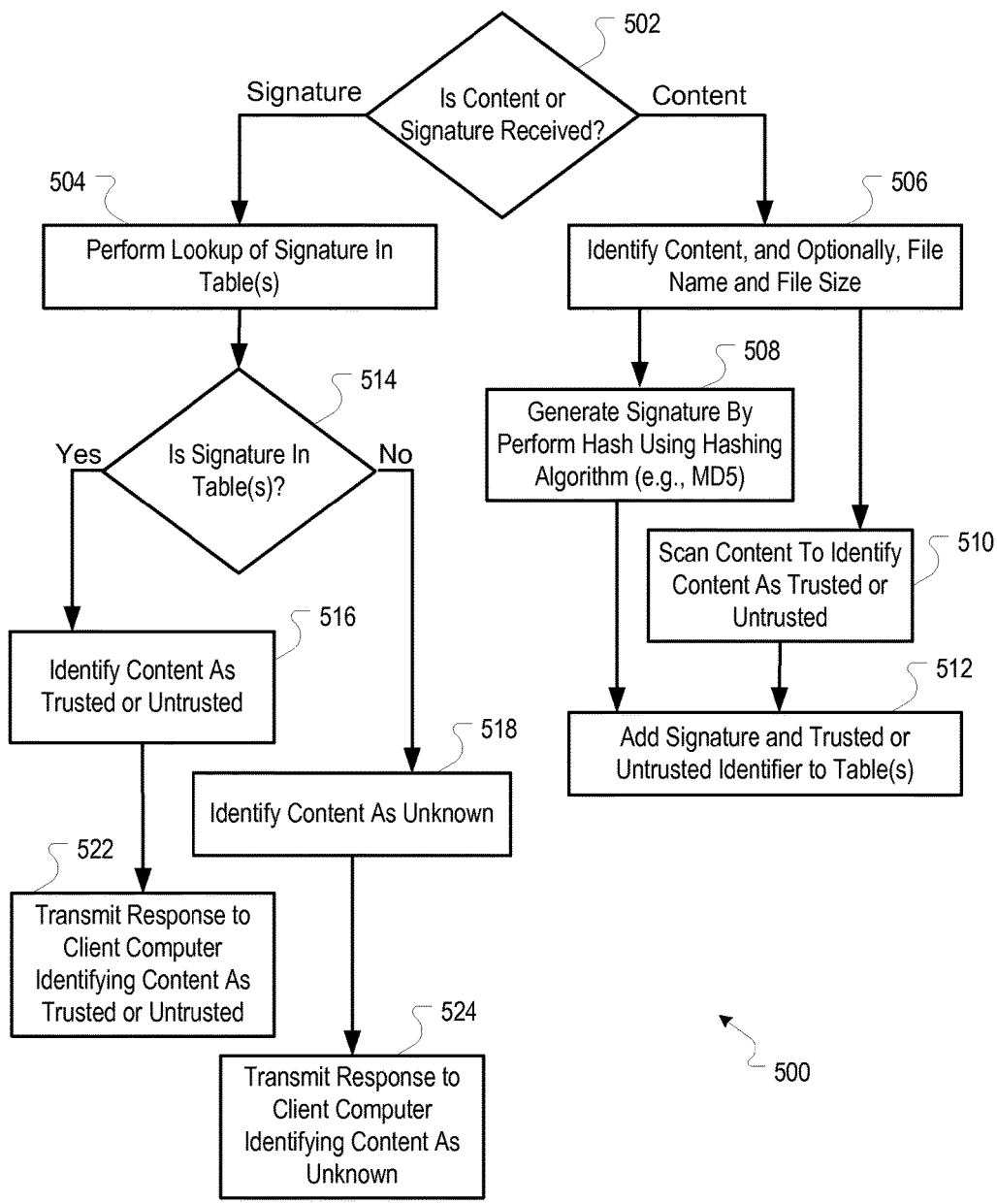
FIG. 5 is a flow diagram of an example process of a malware detection service for providing malware detection.

FIG. 5 is a flow diagram of an example process of a malware detection service for providing malware detection. The process 400 can, for example, be implemented in an MDS 300 within the system 100 of FIGS. 1 and 2. As previously described, the MDS may reside, for instance, in the service system 110.

Stage 502 identifies whether content (e.g., file content) or a signature is received. According to some implementations, the determination is made by the MDS 300 in receipt of a transmission from an access agent.

If content is received, Stage 506 identifies content is, and optionally, a file name and a file size. Next, Stage 508 generates a signature by hashing the content (and optionally the file name and/or file size). For instance, the hash processor 305 of the MDS 300 can generate a signature using a hash algorithm such as MD5. Stage 510 scans the content to determine whether the content is trusted or untrusted, and can identify the content as such. The malware scanner 310 within the MDS, for instance, can execute these functions. In some implementations, if the signature generated by hash processor 305 is already in a global table or a secondary table, the status indication from that table maybe be reported and the scan of stage 510 may be omitted. After a signature is generated and the content is identified as trusted or untrusted, the signature and status indicator (i.e., trusted or untrusted) can be added to one or more tables. For instance, this information may be added to a global table or a secondary table as described above with reference to FIG. 3.

If a signature is received, Stage 504 performs a lookup of the signature in one or more tables. For instance, as described with respect to FIG. 3, the lookup may be performed by an AA request processor 320 of the MDS 300 using a global or secondary table. As described with respect to FIG. 3, the MDS 300 may attempt to perform a lookup of the signature in a first table, such as a global table, prior to attempting to perform a lookup of the signature in one or more secondary tables.

If at Stage 514 the signature is determined to exist in the table(s), Stage 516 identifies the content as trusted or trusted, for instance, based on a status indicator in the table. Stage 522 transmits an identification of the content as trusted or untrusted to the client computer. If at Stage 514 the signature is determined not to exist in the table(s), Stage 518 identifies the content as unknown and Stage 522 transmits an identification of the content as unknown to the client computer. The response is transmitted, for instance, by the AA request processor 320 and is received, for instance, at the access agent.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A network security system, comprising:
a computer operating a malware detection service external to network edges of at least one system, the malware detection service comprising instructions, when executed, cause the computer to:
receive a request from a computer within the at least one system, the request identifying a hash signature associated with a file, wherein, prior to determining the hash signature, a random sequence which does not affect malware is added to the file;
identify a status indicator of content of the file using the hash signature, the hash signature comprises a digest of data in the file;
and transmit the status indicator to the computer within the at least one system.

2. The system of claim 1, further comprising an access agent in communication with the computer and the malware detection service.

3. The system of claim 2, wherein the access agent resides on the computer within the at least one system.

4. The system of claim 2, wherein the hash signature is generated by the access agent, and the access agent causes transmission of the hash signature to the computer responsive to the access agent not finding a matching hash signature to the hash signature in a global table.

5. The system of claim 1, wherein the malware detection service is further configured to perform a lookup in at least one table to identify the status indicator.

6. The system of claim 5, wherein the at least one table comprises a global malware table or a enterprise specific table.

7. The system of claim 5, wherein the malware detection service is further configured to:
receive the file from the computer; and
generate a hash signature for the file.

8. The system of claim 7, wherein the malware detection service is further configured to:
add the hash signature for the file to the at least one table.

9. The system of claim 5, wherein the at least one table resides within the malware detection service.

10. The system of claim 5, wherein the at least one table comprises a list of hash signatures and their respective status indicators.

11. The system of claim 1, wherein the status indicator is selected from the group of status indicators consisting of trusted, untrusted, and unknown.

12. The system of claim 1, wherein the hash signature is generated using Message-Digest Algorithm (MD5).

13. The system of claim 1, wherein the file is prepended with the random sequence prior to generating the hash signature to prevent signature matching by malware.

14. The system of claim 1, wherein the hash signature comprises a digest of the file, file name, and file size, and the hash signature is transmitted to the malware detection service in lieu of transmitting the file.

15. The system of claim 1, wherein the request is performed only if the file has changed since in length or last modified date since a last inspection.

16. The system of claim 1, wherein the hash signature is about 16 bytes of signature information along with about 4 bytes of document length, and the hash signature is sent to the malware detection service instead of the file.

17. The system of claim 1, wherein the random sequence is coordinated between the malware detection service, the computer within the at least one system, and other components in the system.

18. The system of claim 1, wherein the random sequence comprises any of comments in scripts, NOOPs, and data bytes in the file.

19. The system of claim 1, wherein the instructions, when executed, further cause the computer to:
transmit the status indicator as unknown to the computer within the at least one system;
receive the file from the computer within the at least one system; and
inspect the file to determine whether the file is trustworthy.

20. The system of claim 1, wherein the file has a different name from another file that is already determined as trustworthy, and wherein the malware detection service is configured to determine the file is trustworthy if its file size and the hash signature match that of the another file.

21. The system of claim 1, wherein the computer operating the malware detection service is communicatively coupled to the computer within the at least one system and a plurality of additional computers, and responsive to an update, the malware detection service is configured to provide the update to an access agent for the computer within the at least one system and the plurality of additional computers.

22. A method performed in a network security system, the network security system comprising a computer operating a malware detection service external to network edges of at least one system, the method comprising:
receiving a request from a computer within the at least one system, the request identifying a hash signature associated with a file, wherein, prior to determining the hash signature, a random sequence which does not affect malware is added to the file;

identifying a status indicator of content of the file using the hash signature, the hash signature comprises a digest of data in the file; and transmit the status indicator to the computer within the at least one system.

23. The method of claim 22, wherein the random sequence is coordinated between the malware detection service, the computer within the at least one system, and other components in the system, and wherein the random sequence comprises any of comments in scripts, NOOPs, and data bytes in the file.

\* \* \* \* \*